Patented Jan. 13, 1931

1,788,684

UNITED STATES PATENT OFFICE

FRANZ RUDOLF MOSER, OF BUSSUM, NETHERLANDS, ASSIGNOR TO N. V. DE BATAAF-SCHE PETROLEUM MAATSCHAPPIJ, OF THE HAGUE, NETHERLANDS

PROCESS OF SEPARATING EMULSIONS

No Drawing. Application filed September 3, 1924, Serial No. 735,721, and in the Netherlands July 19, 1924.

My invention relates to a material for the separation of petroleum oil emulsions and the like, as well as to a process for the separation of these emulsions. For this purpose various materials have been proposed with which more or less favorable results were obtained. But a wholly satisfactory solution of this difficult and important problem has not hitherto been found, since the results were often not satisfactory and the materials employed were in some cases too expensive.

According to my invention a material is prepared for the separation of petroleum oil emulsions and the like by exposing high boiling fractions of petroleum, after removal of the substances which easily resinify, to the action of sulphuric acid or oleum (i. e. a concentrated sulfonating reagent), preferably with stirring, and by separating the formed products from the unaltered constituents.

A very favorably acting reagent is obtained if the products produced according to my invention are separated from adhering oil by dissolving the reagent in water and (if desired) purifying by precipitation of the colloids or by dialysis.

I have further found that the products according to my invention could be dried by steam heating and also could be pulverized which is especially of advantage for the transportation of my new material.

The active constituent of the new material appears to be that part of the non-resinous acid tar which has the property of forming colloidal solutions in water. The ordinary acid tar which is obtained in the refining of lubricating oils by treating same with sulphuric acid contains only traces of these materials. If the sulphuric acid, during refining, is used in installments then the acid tar which is formed and separated from the oil by the addition of the first portions is almost entirely free from products soluble in water, so long as resinous materials are being produced. These colloidally watersoluble materials are only formed in large quantities after the removal of the easily resinifying constituents of the oil. By applying oleum instead of sulphuric acid the yield is considerably increased, perhaps because oleum is a more powerful sulfonating reagent. Thus products can be prepared without difficulty which consist for the greater part of hydrophile colloids.

By the action of sulphuric acid on low boiling petroleum fractions such as the gasoline and kerosene fractions, products are obtained which are also soluble in water but these are not colloidal, or only a small proportion thereof is colloidal and their influence on crude oil emulsions is of no importance. When treating the higher fractions of petroleum with sulphuric acid, products are obtained of which the constituent which is soluble in water consists for the greater part of hydrophile colloids which have at the same time the ability to exert a strong surface action.

It has already been proposed to make use of alkali-metal salts of sulphonated mineral oils for the same purpose.

According to my invention the considerable advantage is obtained that the products are easier to manufacture and besides produce a far greater and more perfect separation of the water from the emulsions.

Acid tar formed in refining kerosene has already been applied too, and particularly as a carrier for sulphuric acid which was used because of its coagulating action to break up the emulsion.

According to the present invention the desired result is obtained by the application of the colloids present in the acid sludge. Whether or not free sulphuric acid is present therein is of no importance.

My invention is elucidated by the following examples of the process:

A distillate consisting of light machine oil is previously treated with 3—5% $H_2SO_4$ of 66° Bé. The resin formed is removed, after which the oil preferably while cooling, is treated with oleum of 20% strength, in quantities of 10–20%. This treatment is continued till the specific gravity of the oil only decreases very slightly. This is the case with most lubricating oil distillates when about fifty per cent of the oil has been consumed.

The reaction products settled out and collected amount to about double the weight of the oleum employed. These products, while stirring and if desired also while heating, are dissolved in about twice their weight of water. The excess of oil remains floating on the surface and is removed. Salt (e. g. NaCl) is added to the solution in installments and under stirring until all colloids have been precipitated and the solution is nearly decolorized. By repeating this treatment, the purity can be regulated at will. The precipitated colloidal material forms the reagent used for treating emulsions. The unpurified dark solution (i. e. without adding the salt) can also be applied for the separation of the emulsions. By the precipitation from the solution and subsequent purification of the precipitate, however, a more active, more concentrated product is obtained which can be freed from sulphuric acids by dialysis. It is of great importance that by drying by steam heating an easily transportable product is obtained that has lost nothing of its solubility in water and its activity.

The sulphonated compounds produced by this process, in the preferred form, are not readily soluble in water, to give clear solutions, they do however, readily give colloidal solutions in water; they are not soluble in petroleum oils, they are soluble in alcohol and acetone. They do not form phenols by the alkali fusion process.

I claim:—

1. A process which comprises treating petroleum-and-water emulsions with a colloidal material obtained by treating mineral lubricating oil substantially free from substances liable to resinify, with strong sulphuric acid in excess, diluting the sludge with water, removing unaltered oil therefrom, whereby an aqueous liquid containing colloidal matter results.

2. A process for the manufacture of a material suitable for the separation of petroleum oil emulsions which comprises treating with strong sulphuric acid, a mineral lubricating oil material containing substances which can resinify when the oil is treated with sulphuric acid, to remove such constituents as easily resinify, and thereafter exposing the oil to the action of an excess of strong sulphuric acid, thereafter separating the products formed from the unaltered oily constituents of the sludge, and recovering a colloidal material in said sludge.

3. A process for the manufacture of a material suitable for the separation of petroleum oil emulsions which comprises treating with strong sulphuric acid, a mineral lubricating oil material containing substances which can resinify when the oil is so treated with sulphuric acid, to remove such constituents as easily resinify, and thereafter exposing the oil to the action of an excess of oleum, thereafter diluting the sludge and separating colloidal reaction products which form colloidal suspensions in water, from the unaltered oily constituents in the sludge.

4. A process of treating high boiling mineral oil having a boiling point range and viscosity suitable for use as lubricating oil, containing a substantial amount of substances which are capable of resinification, upon treatment with sulphuric acid, which comprises treating the oil with strong sulphuric acid until such substances capable of resinification are removed from the oil, thereafter treating the residual oil with an excess of concentrated sulphuric acid, separating the sulphonated products from the unaltered oil, and purifying the colloidally water-soluble constituents of the sulphonated products.

5. A process of treating high boiling mineral oil containing a substantial amount of substances which are capable of resinification, upon treatment with sulphuric acid, which comprises treating the oil with strong sulphuric acid until such substances capable of resinification are removed from the oil, thereafter treating the residual oil with several successive batches of concentrated sulphuric acid, the whole of said acid representing an excess, separating the sulphonated products from the unaltered oil, and purifying the colloidally water-soluble constituents of the sulphonated products.

6. A process of breaking petroleum oil emulsions which comprises adding thereto a treating reagent comprising a colloidal material, such reagent being obtained by first removing from high boiling fractions of petroleum, any constituents thereof which easily resinify, thereafter subjecting the remaining oil while substantially free from easily resinifying constituents to the action of an excess of strong sulphuric acid, and thereafter separating a material containing the colloidal products formed from the unaltered oily constituents.

7. A process of breaking petroleum oil emulsions which comprises adding thereto a treating reagent comprising a colloidal material, such reagent being obtained by first removing from high boiling fractions of petroleum, any constituents thereof which easily resinify, thereafter subjecting the remaining oil while substantially free from easily resinifying constituents to the action of an excess of oleum, and thereafter separating a material containing the colloidal products formed from the unaltered oily constituents.

8. A process of breaking petroleum oil emulsions which comprises adding thereto a treating reagent formed by resinifying some of the constituents of a high boiling mineral oil, removing the resinified material and treating the oil with strong sulphuric acid in excess, diluting the sludge to produce an aqueous material containing substantial amounts of colloidal material.

In testimony whereof I affix my signature.

DR. FRANZ RUDOLF MOSER.